United States Patent
Goerbing et al.

(10) Patent No.: US 10,099,373 B2
(45) Date of Patent: Oct. 16, 2018

(54) MULTI-AXIS ROBOT INCLUDING A TOOL HEAD AND A DRAG CHAIN FOR GUIDING FLEXIBLE LINES

(71) Applicant: HEIDELBERGER DRUCKMASCHINEN AG, Heidelberg (DE)

(72) Inventors: Christian Goerbing, Heidelberg (DE); Stefan Maier, Dielheim (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 0 days.

(21) Appl. No.: 15/446,222

(22) Filed: Mar. 1, 2017

(65) Prior Publication Data
US 2017/0259432 A1    Sep. 14, 2017

(30) Foreign Application Priority Data
Mar. 9, 2016   (DE) ......................... 10 2016 203 824

(51) Int. Cl.

| | |
|---|---|
| *B25J 9/16* | (2006.01) |
| *B25J 11/00* | (2006.01) |
| *B25J 19/02* | (2006.01) |
| *H02G 11/00* | (2006.01) |
| *B25J 9/00* | (2006.01) |
| *B25J 19/00* | (2006.01) |
| *B41J 2/01* | (2006.01) |

(Continued)

(52) U.S. Cl.
CPC ........... *B25J 9/1669* (2013.01); *B25J 9/0084* (2013.01); *B25J 9/0087* (2013.01); *B25J 11/0075* (2013.01); *B25J 19/0025* (2013.01); *B25J 19/02* (2013.01); *B25J 19/026* (2013.01); *B41J 2/01* (2013.01); *B66C 11/00* (2013.01); *B25J 15/0019* (2013.01); *H02G 11/00* (2013.01)

(58) Field of Classification Search
None
See application file for complete search history.

(56) References Cited

U.S. PATENT DOCUMENTS

| | | |
|---|---|---|
| 7,571,025 B2 | 8/2009 | Bischoff |
| 9,266,353 B2 | 2/2016 | Beier et al. |
| 9,399,299 B2 | 7/2016 | Hermey et al. |

(Continued)

FOREIGN PATENT DOCUMENTS

| | | |
|---|---|---|
| DE | 20305677 U1 | 7/2003 |
| DE | 10245984 A1 | 4/2004 |

(Continued)

*Primary Examiner* — Binu Thomas
(74) *Attorney, Agent, or Firm* — Laurence A. Greenberg; Werner H. Stemer; Ralph E. Locher

(57) ABSTRACT

A multi-axis robot includes robot drives, a tool head, a drag chain for guiding flexible lines along at least a part of the robot up to the tool head, and an auxiliary system for moving a tool head-side end of the drag chain. The auxiliary system includes at least one auxiliary system drive for moving the tool head-side end. The auxiliary system drive is different than the robot drives. The multi-axis robot advantageously allows collisions between the tool-side end of the drag chain and the object to be treated or other objects in the vicinity of the robot to be avoided, ensuring that the surface of the object may be treated, in particular printed on by an inkjet print head, without disruption.

6 Claims, 3 Drawing Sheets

(51) Int. Cl.
    *B66C 11/00*     (2006.01)
    *B25J 15/00*     (2006.01)

(56) References Cited

U.S. PATENT DOCUMENTS

| | | | |
|---|---|---|---|
| 2005/0199601 A1* | 9/2005 | Inoue | B25J 19/0025 |
| | | | 901/42 |
| 2010/0270521 A1 | 10/2010 | Hock et al. | |
| 2013/0257984 A1* | 10/2013 | Beier | B05B 13/0452 |
| | | | 347/37 |
| 2015/0335387 A1* | 11/2015 | Atzinger | B25J 19/0025 |
| | | | 606/130 |
| 2017/0023154 A1 | 1/2017 | Jaeker et al. | |
| 2017/0106397 A1* | 4/2017 | Akaishi | B05C 11/023 |

FOREIGN PATENT DOCUMENTS

| | | |
|---|---|---|
| DE | 102004026813 A1 | 12/2005 |
| DE | 102006002637 A1 | 8/2007 |
| DE | 202011004786 U1 | 9/2011 |
| DE | 202012004601 U1 | 6/2012 |
| DE | 102012006371 A1 | 7/2012 |
| DE | 202014101590 U1 | 6/2014 |
| DE | 202014100931 U1 | 6/2015 |
| DE | 102014209684 A1 | 11/2015 |

\* cited by examiner

MULTI-AXIS ROBOT INCLUDING A TOOL HEAD AND A DRAG CHAIN FOR GUIDING FLEXIBLE LINES

CROSS-REFERENCE TO RELATED APPLICATION

This application claims the priority, under 35 U.S.C. § 119, of German Application DE 10 2016 203 824.9, filed Mar. 9, 2016; the prior application is herewith incorporated by reference in its entirety.

BACKGROUND OF THE INVENTION

Field of the Invention

The present invention relates to a multi-axis robot including drives, a tool head, and a drag chain for guiding flexible cables or lines.

The technical field of the invention is the field of treating object surfaces, which may have any type of curvature. In particular, the invention deals with printing onto such surfaces.

When object surfaces that are curved in any desired way are treated, in particular printed on, by using a robot-guided tool head, in particular an inkjet print head such as the one disclosed in German Application DE 10 2012 006 371 A1, corresponding to U.S. Pat. No. 9,266,353, it is in general necessary for the tool head to be supplied, for instance with power, through lines that lead to the moving tool head. Such lines may be guided along the robot as disclosed, for instance, in German Utility Model DE 20 2011 004 786 U1, corresponding to U.S. Pat. No. 9,399,299, and may be run through drag chains as disclosed in German Utility Model DE 20 305 677 U1.

A problem that may occur in that context is that the lines limit the movement of the robot, for instance because some movements would cause the lines to wind around the robot. Another problem that may occur is that the lines may collide with the object to be treated or with other objects or with the robot itself. Those problems are to be avoided or eliminated.

German Application DE 10 245 984 A1 discloses a robot arm having a drag chain with a tool-side end which may be fixed to the robot arm or rather to the last member thereof by using a mount and may be moved, i.e. rotated, with that last member. However, the last member of the robot arm usually also carries the tool head, which means that the tool-side end of the drag chain may only be moved and must be moved together with the tool head. Thus, the path of the tool-side end of the drag chain is determined by the path of the tool head, which means that collisions between the tool-side end of the drag chain and the object to be treated or other objects or the robot itself are a possibility. German Application DE 10 245 984 A1 does not solve the problems indicated above.

German Application DE 10 2004 026 813 A1, corresponding to U.S. Pat. No. 7,571,025, discloses the use of two robots or the coordinated, cooperative operation of two robots. One of the robots is referred to as the copy robot, the other as the reference robot. The copy robot follows the path of the reference robot, i.e. of the hand flange thereof. A complex measuring system is used to achieve that following movement. German Application DE 10 2004 026 813 A1, corresponding to U.S. Pat. No. 7,571,025, does not disclose any measures for avoiding collisions or the motional limitation of a robot when drag chains are used.

German Application DE 10 2006 002 637 A1, corresponding to U.S. Application Publication US 2010/0270521, discloses the use of a so-called trolley in connection with a robot. However, the trolley is merely a passive system giving in to tractive forces of the robot. German Application DE 10 2006 002 637 A1, corresponding to U.S. Application Publication US 2010/0270521, does not disclose any measures for actively avoiding collisions or actively avoiding motional limitations of a robot when drag chains are used.

SUMMARY OF THE INVENTION

It is accordingly an object of the invention to provide a multi-axis robot including drives, a tool head and a drag chain for guiding flexible lines, which overcomes the hereinafore-mentioned disadvantages of the heretofore-known robots of this general type and which allows robots that have tool heads, in particular inkjet print heads, and are supplied by lines in drag chains, to be constructed in such a way as to avoid collisions at least between a tool-side end of the drag chain and an object to be treated, other objects, or the robot and/or to avoid motional limitations of the robot.

With the foregoing and other objects in view there is provided, in accordance with the invention, a multi-axis robot comprising robot drives, a tool head, and a drag chain for guiding flexible lines along at least a part of the robot and as far as the tool head. An auxiliary system for moving a tool head-side end of the drag chain has at least one drive for moving the tool head-side end, that drive being different than the robot drives.

The robot of the invention advantageously allows collisions at least between the tool-side end of the drag chain and the object to be treated, other objects, or the robot to be avoided and/or motional limitations of the robot to be avoided. In addition, cable breaks or similar phenomena may be prevented. In other words, the operative range of the robot is either not limited at all, only limited to a small extent, or even maximized. In accordance with the invention, an auxiliary system is used for this purpose. This auxiliary system is an active auxiliary system inasmuch as it includes a drive. This drive is preferably controlled independently of the drives of the robot. A computer is preferably used to control the drive.

In accordance with another preferred development of the robot of the invention, the auxiliary system is an arm disposed to be movable on the multi-axis robot.

In accordance with a further preferred development of the robot of the invention, the drive of the arm is controlled on the basis of a sensor signal.

In accordance with an added preferred development of the robot of the invention, the arm includes a distance sensor and the signal is a distance signal.

In accordance with an additional preferred development of the robot of the invention, the drive of the auxiliary system is controlled on the basis of a path plan that is generated by a computer and is different than a path plan generated by the computer for the tool head. Since the auxiliary system moves the drag chain, in particular the tool-side end of the drag chain, in space and since the movement of the tool head needs to be considered in the process and, in particular, the movement of the tool head needs to be followed at a defined distance and avoiding collisions, the two path plans will in general not be entirely independent from one another. However, the auxiliary system includes at least one separate degree of freedom of movement (i.e. separate from the degrees of freedom of the robot for the tool head). This degree of freedom advantageously enables the auxiliary system to follow the tool head and to make separate evasive movements at the same time.

In accordance with yet another preferred development of the robot of the invention, the auxiliary system is a trolley.

In accordance with yet a further preferred development of the robot of the invention, the auxiliary system is a further multi-axis robot.

In accordance with yet an added preferred development of the robot of the invention, the tool head is an inkjet print head and/or a head for treating applied ink with radiation.

In accordance with a concomitant preferred development of the robot of the invention, the flexible lines include at least one line for electrically actuating the print head and at least one line for feeding ink to the print head.

Other features which are considered as characteristic for the invention are set forth in the appended claims.

Although the invention is illustrated and described herein as embodied in a multi-axis robot including drives, a tool head and a drag chain for guiding flexible lines, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
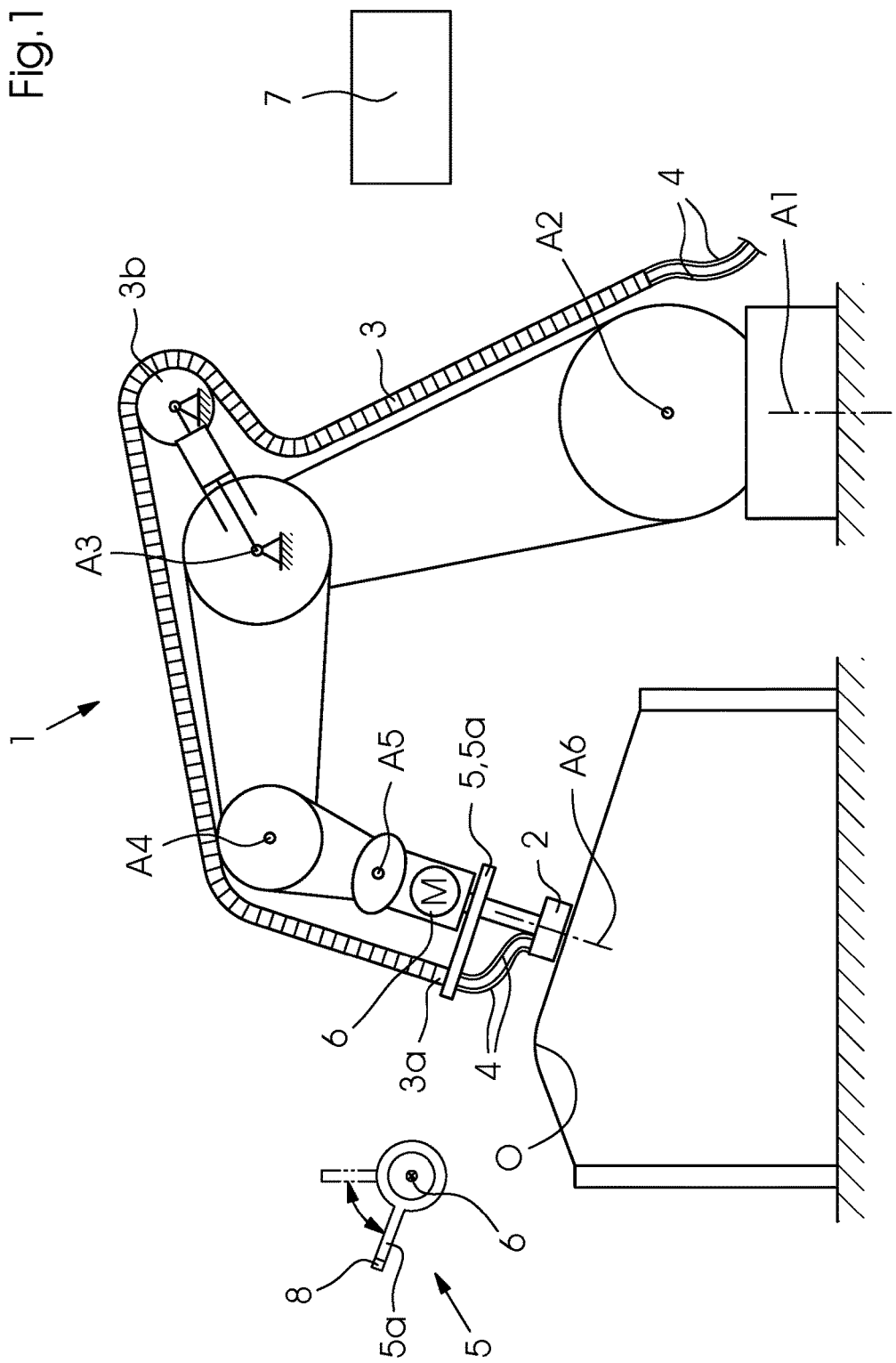
FIG. 1 is a diagrammatic, side-elevational view of a preferred exemplary embodiment of a device according to the invention.

Referring now to the figures of the drawings in detail and first, particularly, to FIG. 1 thereof, there is seen a multi-axis robot 1, which is preferably fixed to the floor and includes a tool head 2 attached to a (non-illustrated) flange of the robot. In the illustrated exemplary embodiment, the tool head 2 is an inkjet print head. The tool head might alternatively be a head for treating applied ink with radiation, for instance a UV or IR radiation dryer. In accordance with another alternative, the tool head might be a combination of an inkjet print head and a radiation dryer. Finally, the tool head may alternatively or additionally include further components, for instance a plasma nozzle for cleaning the surface to be printed on prior to the application of the print.

The robot 1 has a number of robot axes. In the illustrated example, there are six robot axes and robot drives A1 to A6, in which each respective axis is assigned a separate drive. Such robots are commonly referred to as rotary joint robots or industrial robots. They allow the tool head to be freely positioned and aligned in space, i.e. relative to an object to be treated.

The tool head 2 on the front end of the robot 1 is supplied by flexible lines 4, which run in a likewise flexible drag chain 3 (which is also known as a cable carrier or energy chain). The drag chain 3 runs on the outside of the robot. In the case of an inkjet print head, the lines 4 are at least one line for electrically controlling the print head (cable) and at least one line for conveying ink to the print head (hose). Both the lines 4 and the drag chain 3 are constructed to be flexible, allowing them to follow the movements of the robot in space. The drag chain 3 has a tool head-side end 3a. The lines 4 continue from the tool head-side end 3a to the tool head 2. In addition, the drag chain 3 may be received on the robot 1 by using a tensioning system 3b (including a pneumatic cylinder and a roll disposed thereon for guiding the drag chain), which ensures that the drag chain 3 is under the required tension as the robot moves. Instead of the aforementioned drag chain 3, any other suitable cable guide may be used. In this context, suitable is understood to mean that the lines may be moved together with the robot in a secure and accurate way, effectively avoiding damage to the lines.

The end 3a of the drag chain 3 is disposed on an auxiliary system 5, which is in turn disposed on the robot 1. The auxiliary system is constructed to provide controlled, active movement of the tool-side end 3a of the drag chain. This movement is independent of the movements of the axes A1 to A6, i.e. of the associated robot drives and thus has its own auxiliary system drive 6. Thus, the drive 6 is a different drive than the drives A1 to A6 provided on the robot. The drive 6 is preferably a rotary drive.

FIG. 1 additionally includes a separate top view of the auxiliary system 5. It can be seen that the auxiliary system 5 of the exemplary embodiment includes an arm 5a that is disposed for rotation on the robot 1 and may carry out a rotary movement by using the drive 6. In this way, it is advantageously possible to move the end 3a of the drag chain 3 relative to the robot 1 and thus relative to the tool head 2 as well. In the illustrated exemplary embodiment, the movement in accordance with the invention is preferably a circular movement or at least a movement on a segment of a circle in an angular range of between 0° and 360°. The axis of rotation for the drive 6 preferably coincides with the axis of rotation A6 or is at least disposed to be parallel thereto.

When the robot 1, i.e. the tool head 2 disposed on the robot, moves along the surface of an object O at a predefined operating distance, the tool head 2 will need to assume different positions and orientations in space if the object is an object with an arbitrarily curved surface, as indicated in the example. Thus, in addition to the robot, the device of the invention also includes a computer 7, which provides the required control signals or data to the robot as required for the robot to move the tool head 2 through the planned paths. In this context, the following potential disadvantage might occur: the drag chain 3 might wrap around the robot as the robot moves or the tool-side end 3a might collide with a section of the surface of the object O. Even motional limitations of the robot might occur. However, in accordance with the invention, such situations are avoided. The computer 7 not only controls the robot 1, but also the auxiliary system 5. Thus, it is possible for the auxiliary system to carry out compensatory movements in order to prevent the drag chain 3 from wrapping around the robot in an unfavorable way or in order to prevent the tool-side end 3a of the drag chain 3 from moving into a position of collision or in order to avoid any other disadvantageous limitations. The computer 7 is provided with sufficient data to guide the tool head 2 along the planned paths along the surface of the object. Signals or data for controlling the auxiliary system 5 or rather the drive 6 thereof may be derived from these data.

This process will be explained based on the following simple example: for instance, if a movement of the robot 1 would cause the tool-side end 3*a* of the drag chain 3 to collide with a protruding portion of the surface of the object O, the computer 7 may control the auxiliary system 5 in such a way that the latter carries out a substantially counteracting movement in order to prevent the tool-side end 3*a* from getting into the position of collision. For this purpose, the software running on the computer is provided with data on the object and the surface thereof and, if applicable, with data on additional objects and the shape, position and orientation in space thereof. Another object may be understood to include the robot itself.

It may be envisaged to detect the axes A1 to A6 and the respective positions thereof and to forward the positional data to the computer 7. The computer may then derive control signals or data for the auxiliary system 5 from the position of the robot 1 to ensure that the auxiliary system and the tool-side end 3*a* of the drag chain 3 carry out the required evasive movements.

Alternatively, it may be envisaged that the motion path that has been planned in advance to control the robot 1 is used to calculate an additional movement of the auxiliary system 5 based thereon and to finally initiate this movement. For this purpose, a heuristic method that has previously been deemed suitable or a weight function may be used.

Alternatively or additionally, it may be envisaged that the auxiliary system 5 includes a sensor 8, preferably a distance sensor, in particular an ultrasound sensor, to measure the distance between the arm 5*a* or rather its end distal to the robot and the surface of the object O or other objects in space and to send a signal to the drive 6 when a failure to keep a minimum distance is imminent. The drive 6 will then initiate a compensatory movement of the arm to ensure that at least the minimum distance is maintained. In this way, collisions may advantageously and effectively be prevented.

Figure 2:
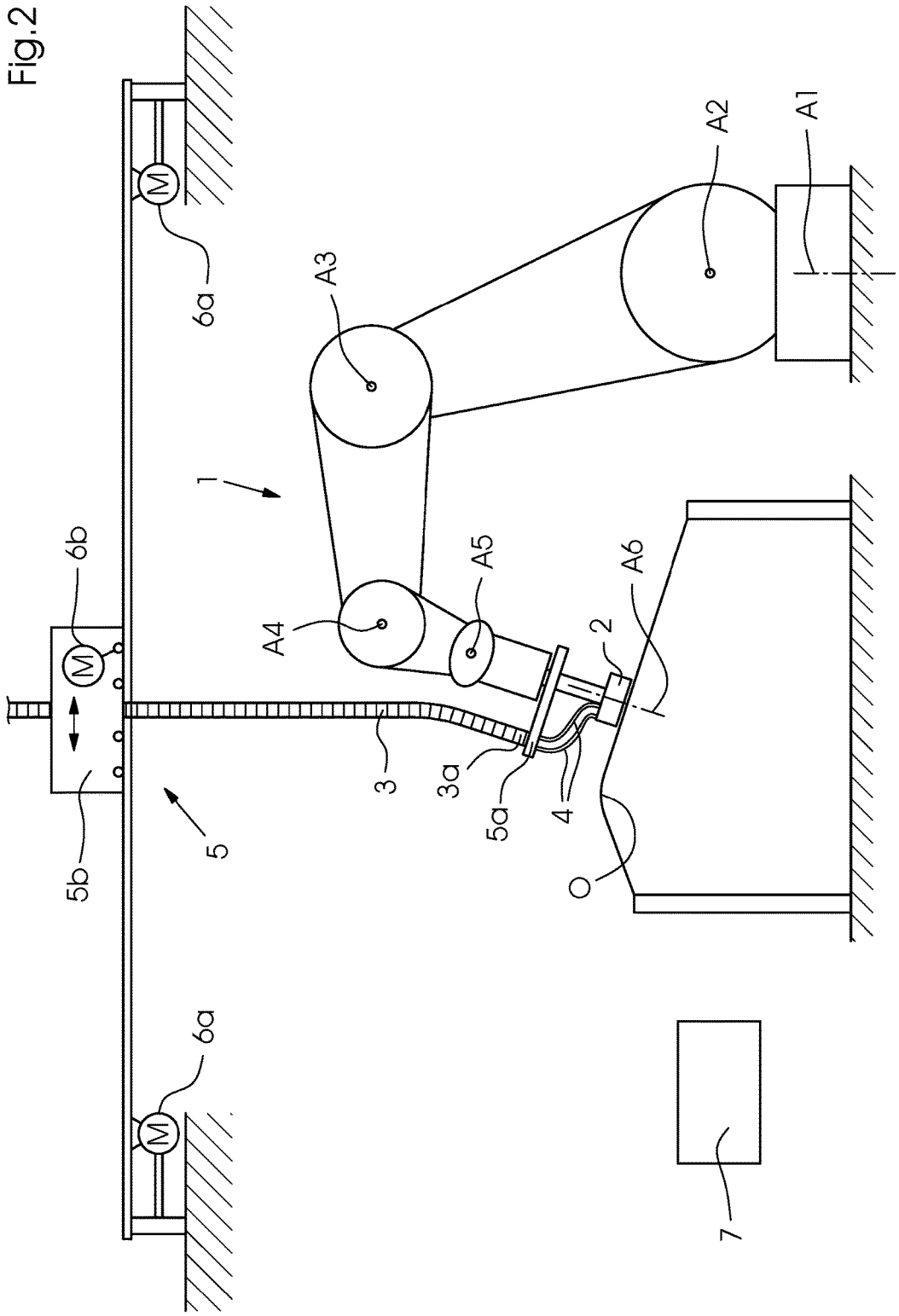
FIG. 2 is a side-elevational view of another preferred exemplary embodiment of a device according to the invention.

FIG. 2 is likewise a side view of a robot 1 including a tool head 2 for treating the surface of an object O. The tool-side end 3*a* of the drag chain 3 is likewise fixed to an arm 5*a*. As shown in the exemplary embodiment of FIG. 1, the arm 5*a* may be movable by using a separate drive. However, the arm may be disposed on the robot in such a way as to be immobile.

An auxiliary system 5 is provided in order to prevent the drag chain 3 from wrapping around the robot 1 as the latter moves or from colliding with other objects in space. This auxiliary system is basically a trolley 5*b*, which is preferably disposed above the robot 1, potentially close to a ceiling. The trolley allows the drag chain 3 to be moved in two directions that are perpendicular to one another. For this purpose, the trolley is equipped with drives 6*a* and 6*b*, preferably servomotors. When the robot moves in space to treat the object O, the computer 7 controls not only the robot but also the trolley 5*b* in such a way as to prevent the drag chain 3 from assuming any undesired positions and orientations, in particular collision positions. The trolley 5*b* thus forms an active, computer-controlled auxiliary system that does not simply follow the robot due to tractive forces applied by the robot 1 or the drag chain 3.

Figure 3:
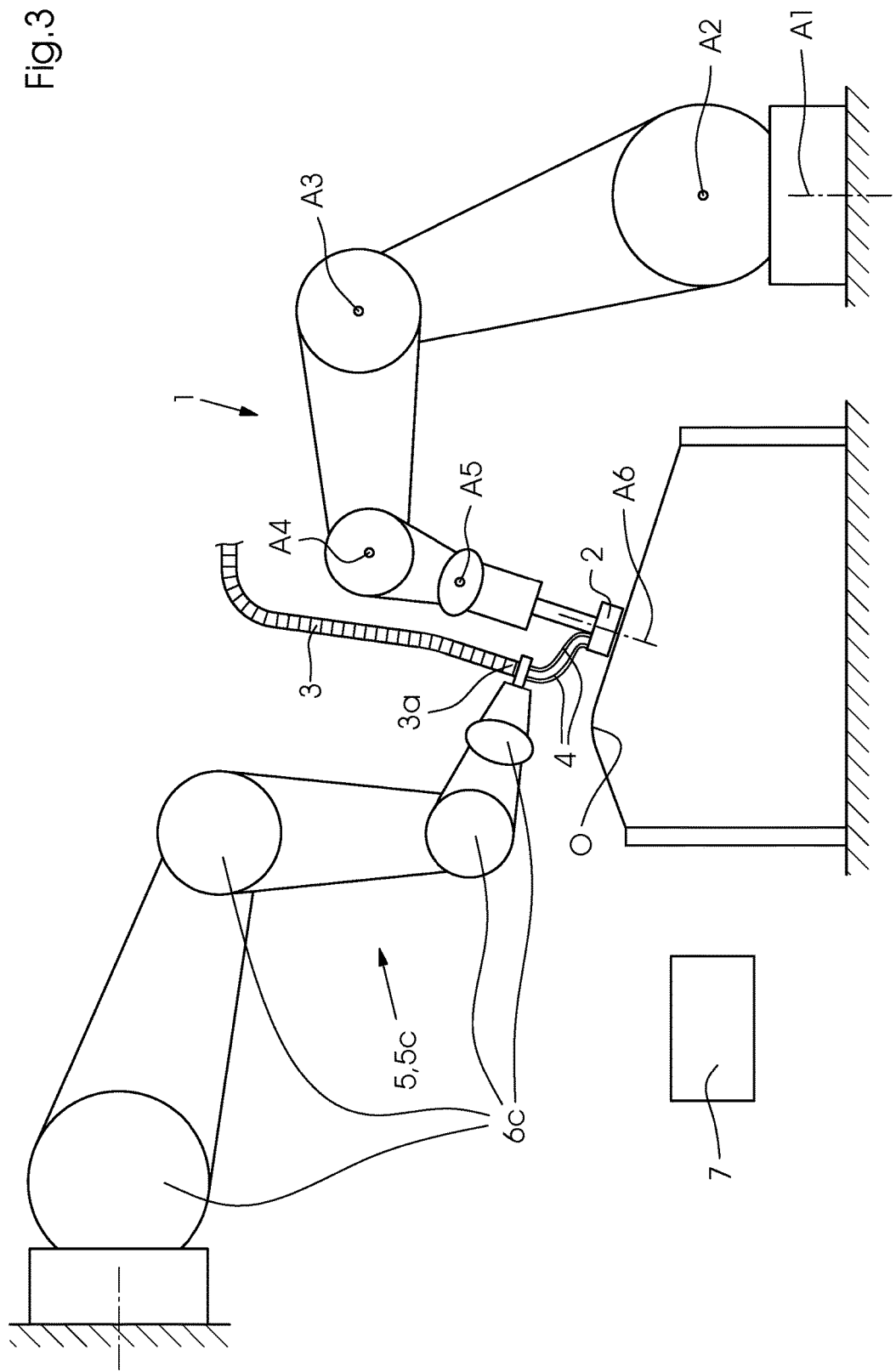
FIG. 3 is a side-elevational view of a further preferred exemplary embodiment of a device according to the invention.

The side view of FIG. 3 illustrates another exemplary embodiment of the invention. In addition to the robot 1 for treating the surface of the object O shown in FIGS. 1 and 2, an auxiliary system 5 provided in this embodiment is a second multi-axis robot 5*c*, which is preferably fixed to a wall. However, the robot 5*c* does not carry a tool head but instead has the tool-side end 3*a* of the drag chain 3 fixed to its front end or hand. The accuracy requirements (in terms of manufacturing, control, movement) for the robot 5*c* need not be as stringent as for the robot 1.

In this example, the computer 7 controls both robots 1 and 5*c* to ensure that the tool-side end 3*a* of the drag chain 3 does not collide with the surface of the object O, with other objects, or with the robot 1. As far as possible, the robot 5*c* is also controlled in such a way as to prevent the drag chain 3 from unfavorably wrapping around the robot 1 or from limiting the robot's freedom of movement to an undesired extent.

A technical configuration that may be an alternative to the configuration of the invention may be to provide a rope, e.g. a sheathed steel rope or similar element (which is a drag element in general such as a rope, belt, or chain) instead of the auxiliary system 5 for holding the tool-side end 3*a* of the drag chain 3. The rope is fixed (and preferably centered) on the tool-side end of the drag chain and on the tool head 2 or the flange thereof or the flange of the robot, and in this way, in combination with a tensioning system 3*b*, maintains a defined distance between the tool-side end of the drag chain and the tool head. At the same time, the rope accommodates almost any desired movement of the tool head due to the flexibility of the rope. When the path of the robot or tool head is planned, the fact that an end of the rope and consequently the tool-side end of the drag chain follows the head is already factored in. An advantage of this configuration is that the flexible rope does not present a disturbing contour that limits the movement of the robot to a considerable extent. At the same time, the rope acts to release the tension of the lines 4 in a sufficient way.

The invention claimed is:

1. A multi-axis robot, comprising:
   robot drives;
   a tool head;
   flexible lines;
   a drag chain for guiding said flexible lines along at least a part of the multi-axis robot up to said tool head, said drag chain having a tool head-side end; and
   an auxiliary system for moving said tool head-side end of said drag chain, said auxiliary system including at least one auxiliary system drive for moving said tool head-side end, said auxiliary system drive being different than said robot drives;
   said auxiliary system being an arm movably disposed on the multi-axis robot, said at least one auxiliary system drive of said arm being controlled on a basis of a sensor signal, said arm including a distance sensor, for measuring a distance between said arm and an object.

2. A multi-axis robot, comprising:
   robot drives;
   a tool head;
   flexible lines;
   a drag chain for guiding said flexible lines along at least a part of the multi-axis robot up to said tool head, said drag chain having a tool head-side end;
   an auxiliary system for moving said tool head-side end of said drag chain, said auxiliary system including at least one auxiliary system drive for moving said tool head-side end, said auxiliary system drive being different than said robot drives; and
   a computer, said computer generating a path plan as a basis for controlling said auxiliary system drive and said computer generating a different path plan for said tool head.

3. The multi-axis robot according to claim 2, wherein said auxiliary system is a trolley.

4. The multi-axis robot according to claim 2, wherein said auxiliary system is another multi-axis robot.

5. The multi-axis robot according to claim 2, wherein said tool head is at least one of an inkjet print head or a head for treating applied ink with radiation.

6. The multi-axis robot according to claim 5, wherein said flexible lines include at least one line for electrically controlling said print head and at least one line for conveying ink to said print head.

\* \* \* \* \*